United States Patent
Hara et al.

(10) Patent No.: US 6,770,386 B1
(45) Date of Patent: Aug. 3, 2004

(54) MAGNETIC RECORDING MEDIUM AND ITS MANUFACTURING METHOD

(75) Inventors: Yoshiaki Hara, Hitachinaka (JP); Takahiko Sugawara, Atsugi (JP); Yutaka Shimizu, Atsugi (JP); Takuya Uzumaki, Atsugi (JP); Atsushi Tanaka, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 363 days.

(21) Appl. No.: 09/654,487

(22) Filed: Sep. 1, 2000

(30) Foreign Application Priority Data

Sep. 2, 1999 (JP) .......................................... 11-248830

(51) Int. Cl.⁷ .............................. G11B 5/66; G11B 5/70; B05D 5/12
(52) U.S. Cl. ............................. 428/694 TM; 428/64.3; 428/213; 428/900; 427/130; 427/131
(58) Field of Search ......................... 428/694 TM, 900, 428/213, 64.3; 427/130, 131

(56) References Cited

U.S. PATENT DOCUMENTS 6,280,813 B1 * 8/2001 Carey et al. ................ 428/65.3
6,331,364 B1 * 12/2001 Baglin et al. ............ 428/694 T
6,391,430 B1 * 5/2002 Fullerton et al. ........... 428/212

* cited by examiner

Primary Examiner—Holly Rickman
(74) Attorney, Agent, or Firm—Greer, Burns & Crain, Ltd.

(57) ABSTRACT

A magnetic recording medium with a high recording density has a first ferromagnetic layer, a non-magnetic layer, and a second ferromagnetic layer successively deposited as the recording layer on a non-magnetic substrate. The recording layer is heated in concentric circular shapes to divide it into regions in which the magnetic interactions between the ferromagnetic layers exhibit ferromagnetism and regions that exhibit anti-ferromagnetism. The ferromagnetic regions are used for recording tracks, and the anti-ferromagnetic regions function as guard bands. In this manner track density is increased without roughening the surface of the recording medium.

5 Claims, 7 Drawing Sheets

MAGNETIC RECORDING MEDIUM AND ITS MANUFACTURING METHOD

BACKGROUND OF THE INVENTION

1. Field of the Invention

The present invention relates to a magnetic recording medium that is used in hard disk drives, and the method for manufacturing this medium. More particularly, the present invention relates to improvements to a recording medium providing enhanced surface recording densities. Further still, the present invention discloses improvements that increase the density.

2. Description of the Prior Art

Conventional technology offers a magnetic disk medium 60, as shown in FIG. 1A, in which an underlayer 2 is a non-magnetic material, such as chromium, and is deposited on a non-magnetic substrate 1, such as an aluminum substrate. In addition, a magnetic layer 3 composed of an alloy having cobalt as the primary component is formed on the underlayer 2. Furthermore, a protective film 4 such as amorphous carbon is formed on the magnetic layer 3.

In order to increase the track density of the magnetic disk medium, the core width of the magnetic head for recording must be narrowed and the width of a recording track must be reduced. However, in a method which uses a magnetic head to record information, excess recording takes place in the sections (guard bands) between the recording tracks due to the leak magnetic field generated from the side surface of the recording head. This kind of recording is called side erase and is a source of noise during reproduction. The width of the side erase will hardly change unless the gap length and the amount of head flotation are reduced, even if the track density is increased and the core width of the magnetic head for recording is narrowed. Therefore, the signal-to-noise ratio (S/N) during recorded data reproduction becomes hard to guarantee as the track width decreases.

As shown in FIG. 1B, a disk medium 61 in which the tracks 9 are physically separated during manufacturing by forming grooves 8 along the circumferential direction of the disk substrate 1 and guard bands are allocated to the grooves. In this magnetic disk medium 61, if the depth of the grooves is adequate, the leak magnetic field from the recording head does not reach the magnetic layer 3 on the groove 8, and track edge noise is suppressed. This is believed to be effective in increasing the track density.

The width of a guard band is expected to be no more than 0.2 $\mu$m as the tracks achieve higher density in the future. Consequently, the groove width must follow this decrease, but there are limitations in the groove forming techniques.

Furthermore, a medium that is formed with grooves has a roughness that causes a height difference ranging from several dozen nanometers to several hundred nanometers on the surface of the medium. In future magnetic disk media, the amount of flotation of the magnetic head will become 30 nm or less as the density increases. In a hard disk drive, air current that is generated by the high-speed rotation of the disk raises the slider that mounts the magnetic head in order to allow the magnetic head to record and reproduce with no contact with the disk. However, if there is roughness on the disk's surface, turbulence in the air current will produce fluctuations in the level of flotation of the slider, the result of which is instability. This presents a significant problem for the extremely small amounts of flotation of 30 nm or less that is demanded for future magnetic disk media.

SUMMARY OF THE INVENTION

One object of the present invention is to provide a magnetic recording medium suited for high-density recording. Another object is to provide a magnetic recording medium that has a high track density. Still another object is to provide a magnetic recording medium that has a high signal to noise ratio. A further object is to provide a magnetic recording medium which reduces writing to the guard bands. Yet another object is to provide a magnetic recording medium that allows lower flotation of the magnetic head.

In keeping with one aspect of the invention, a magnetic recording medium includes a recording layer deposited on a non-magnetic substrate. The recording layer includes a first ferromagnetic layer, a non-magnetic layer, and a second ferromagnetic layer successively deposited on the non-magnetic substrate.

Certain regions of the recording layer are heated to create recording areas in which the first and second ferromagnetic layers are ferromagnetically coupled. The recording areas are separated by non-recording areas in which the first and second ferromagnetic layers are anti-ferromagnetically coupled.

Other objects and advantages of the present invention will be apparent from the following description, the appending claims and accompanying drawings.

BRIEF DESCRIPTION OF THE DRAWINGS

Preferred embodiments of the present invention are described herein with reference to the drawings wherein.

DESCRIPTION OF THE PREFERRED EMBODIMENTS

Figure 2A:
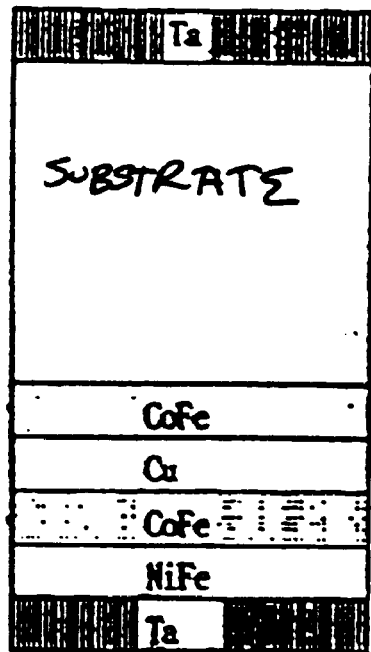
FIG. 2A is a diagram of the film structure of a conventional spin valve type read head.
Figure 2B:
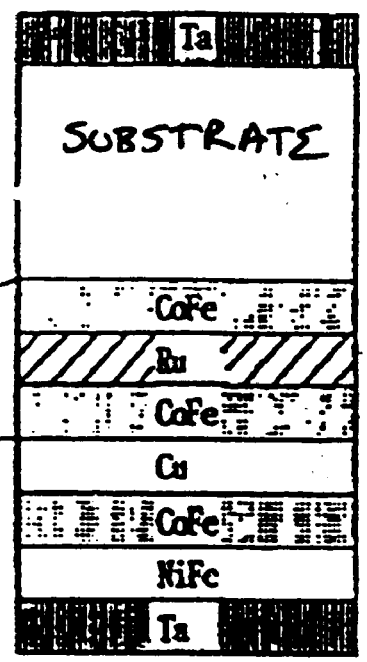
FIG. 2B is a diagram of the film structure of a read head having a multilayered ferromagnetic spin valve film.
Figure 3B:
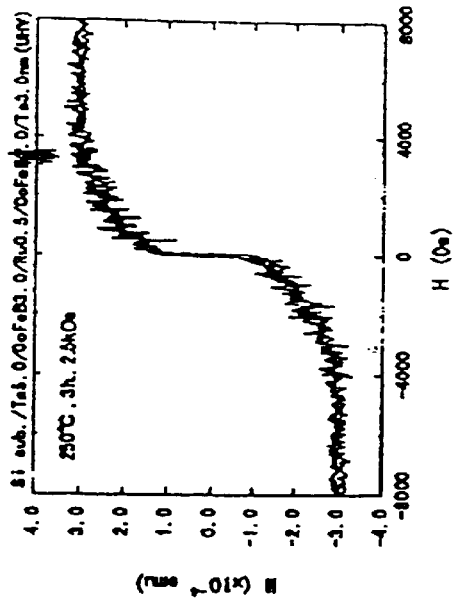
FIGS. 3A, 3B, 3C and 3D are graphs that plot the characteristics of the dependence of the magnetization lines in a multilayered ferromagnetic film on the applied magnetic field and the annealing temperature.
Figure 3D:
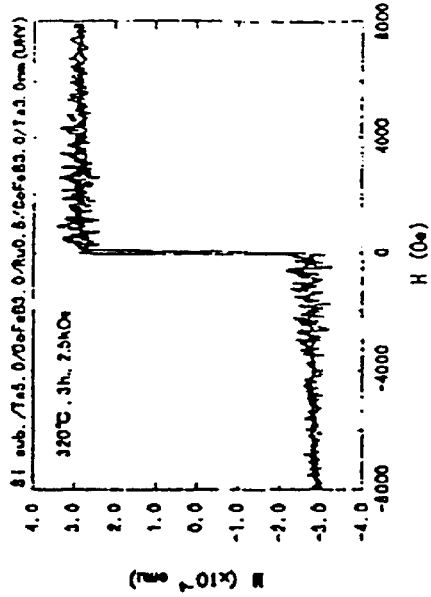
Figure 3A:
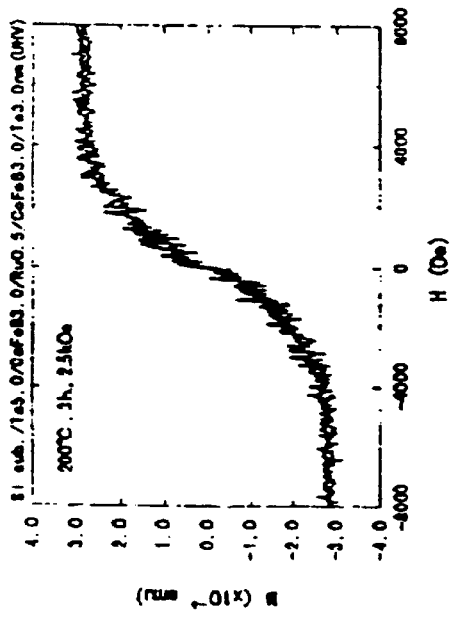
Figure 3C:
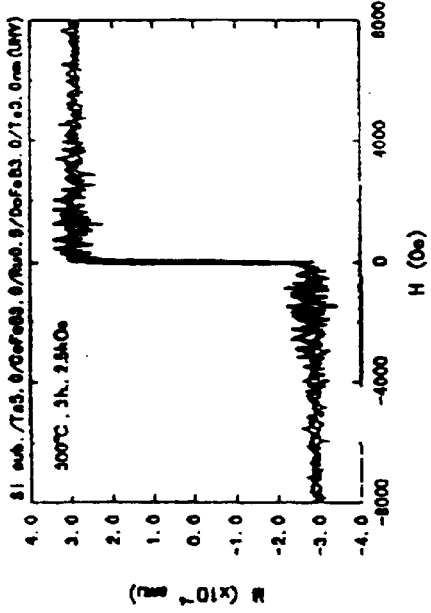

To better understand the present invention, a multilayered ferromagnetic spin valve film which is used in a read head will be described. The multilayered ferromagnetic spin valve film (FIG. 2B) differs from a conventional spin valve film (FIG. 2A) and features a pinned layer composed of three layers of a ferromagnetic layer 15, a non-magnetic layer 16, and a ferromagnetic layer 17. The ferromagnetic layers forming the pinned layer are Co or CoFe and the non-magnetic layer is Ru. By making the film thickness of the Ru layer 10 Angstroms or less, magnetic interactions exhibit anti-ferromagnetism between the upper and lower magnetic layers. Ru diffusion begins if this type of multi-layered ferromagnetic spin valve film is maintained for several hours at a temperature around 250° C., under various conditions. As a result, pin holes are partially formed and ferromagnetic coupling is produced between the upper and lower ferromagnetic layers. Thus, the film begins changing from anti-ferromagnetism (or ferromagnetism) to ferromagnetism with heating.

FIGS. 3A through 3D are graphs showing the dependence of the magnetization line on the annealing temperature in the multilayered ferromagnetic spin valve film. These figures show the characteristics for annealing temperatures of 200° C., 250° C., 300° C., and 320° C., respectively. The multilayered ferromagnetic spin valve film used here is composed of Ta (50), CoFeB (30), Ru (5), CoFeB (30), and Ta (30) successively deposited in layers on a Si substrate. The number enclosed by parentheses indicates the film thickness in Angstroms.

In the state having an annealing temperature of 200° C., the magnetic field Hs is large (around 4,000 Oe) where saturation of magnetization occurs, and the residual magnetization is 0. The upper and lower magnetic layers are in the anti-ferromagnetic coupling state.

As the annealing temperature increases, Hs becomes smaller, residual magnetization develops, and the upper and lower magnetic layers change to ferromagnetic coupling because the magnetic layers partially couple ferromagnetically by spreading to the magnetic layer in the Ru layer.

The magnetic layer—non-magnetic layer—magnetic layer structure exhibits ferromagnetic coupling between the magnetic layers by heating it to at least 250° C. The present invention focuses on this phenomenon and applies it to produce high track density in the medium.

Turning now to this invention, a magnetic recording medium is formed by successively depositing a first ferromagnetic layer, a non-magnetic layer, and a second ferromagnetic layer as the recording layer. The magnetic recording medium has some regions that anti-ferromagnetically couple and are incapable of magnetic recording. Other regions ferromagnetically couple the first and second ferromagnetic layers and are capable of magnetic recording. A high degree of surface smoothness is obtained because grooves are not formed. Therefore, a further decrease in the amount of flotation of the head and a higher recording density can be designed. Furthermore, manufacturing costs can be reduced.

The regions that are anti-ferromagnetically coupled and the regions that are ferromagnetically coupled as described above are concentric and alternately placed in a radial direction. According to this structure, the regions which are ferromagnetically coupled can be allocated as the recording tracks, and the regions that are anti-ferromagnetically coupled can be allocated as the guard bands. Thus, track edge noise is suppressed and a high S/N can be maintained even for a narrower recording track pitch. In addition, the width of a guard band can be narrower than the width of a guard band provided by a groove. The regions will narrow following the narrower track width because the regions to be heated are allocated to become recording tracks having a relatively wide width. As a result, a higher track density can be designed for the magnetic recording medium.

In this embodiment of the invention, a state is produced in which magnetic recording is not possible due to the mutual negation of the magnetization because the ferromagnetic layers which are anti-ferromagnetically coupled form a magnetically closed circuit and the magnetic flux does not leak to the outside.

The film thickness of the non-magnetic layer in the recording layer is preferably 10 Angstroms or less in the magnetic recording medium of this embodiment. Based on this structure, a state is produced in which magnetic recording is not possible and the first and second ferromagnetic layers are anti-ferromagnetically coupled.

The magnetic recording medium is manufactured by successively depositing a first ferromagnetic layer, a non-magnetic layer, and a second ferromagnetic layer on a non-magnetic substrate and locally heating the non-magnetic layer. In a heated region, the first and second ferromagnetic layers are ferromagnetically coupled and magnetic recording becomes possible. In a region which is not heated, both ferromagnetic layers are anti-ferromagnetically coupled and magnetic recording is not possible. By using this manufacturing method, the magnetic recording medium is divided into regions that are capable of magnetic recording and regions that are incapable of magnetic recording. A high degree of surface smoothness is obtained because the implementation does not use a forming process such as groove forming. Therefore, the amount of flotation of the head can be further reduced, a higher recording density can be produced, and manufacturing cost can be reduced.

Preferably, the recording layer is heated in concentric circular shapes. The heated regions can be allocated as the recording tracks because magnetic recording is possible, and the intervening regions which are not heated can be allocated as the guard bands because magnetic recording is not possible. Consequently, track edge noise can be suppressed, and a high S/N can be maintained even for a narrower recording track pitch. In addition, the width of a guard band can be narrower than the width of a guard band provided by a groove. Furthermore, the regions can be narrowed even as the track width becomes more narrow because the regions to be heated are allocated to be relatively wide recording tracks. Thus, a higher track density can be designed for the magnetic recording medium.

The coupling state of the first and second ferromagnetic layers can change from anti-ferromagnetic to ferromagnetic by heating the recording layer to at least 250° C. Heating the recording layer by local irradiation, for example by a laser, a light, or an electron beam, the width of the regions which are ferromagnetically coupled (i.e. the width of the recording tracks) can be narrower. This is effective in increasing the track density of the magnetic recording medium.

Figure 4:
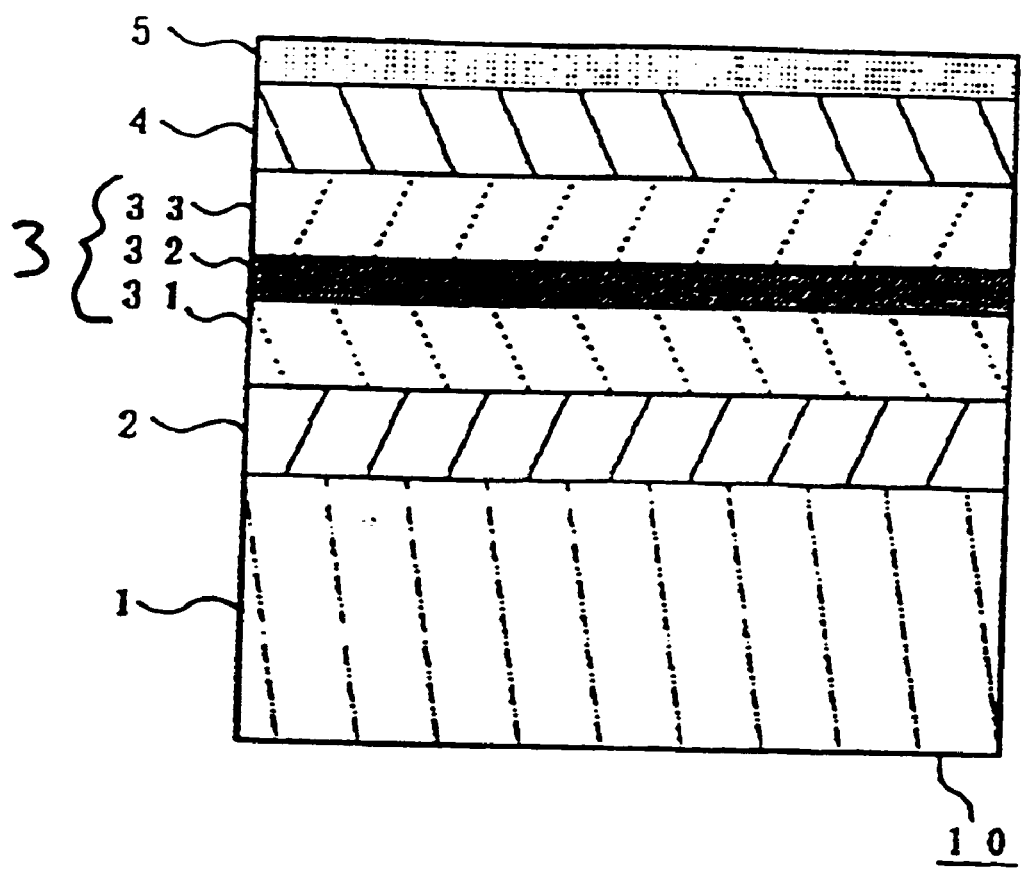
FIG. 4 is a cross-sectional view of the magnetic recording medium of the present invention.

FIG. 4 shows a cross-section of a magnetic recording medium 10 of the present invention. Specifically, an underlayer 2, a recording layer 3, and a protective layer 4 are successively deposited on the non-magnetic substrate 1, and then a layer of a lubricant 5 is formed on the protective layer 4. The recording layer 3 has a multilayered ferromagnetic structure and is composed of the three layers of a lower ferromagnetic layer 31, a non-magnetic layer 32, and an upper ferromagnetic layer 33. Each film that comprises the magnetic recording medium 10 is described below.

The substrate 1 is composed of a non-magnetic material and has a disk shape. The material forming the substrate 1 can include: a disk of aluminum (including aluminum alloys) plated with NiP, a glass disk (including reinforced glass), a silicon disk having a surface oxide film, a SiC disk, a carbon disk, a plastic disk, and a ceramic disk.

The substrate 1 does not have to undergo texture processing. In addition, the size of the substrate 1 is determined to correspond to the type of preferred medium and the magnetic disk apparatus to be used; the diameter is generally 1 inch to 3.5 inches, and the thickness is generally 0.5 mm to 1.0 mm.

The underlayer film 2 is composed of a non-magnetic metal material having chromium as its main component. The specific material is a metal material having only chromium as the main component, or a chromium alloy such as CrW, CrV, CrTi, or CrMo. The underlayer film 2 is deposited in a layer by, for example, magnetron sputtering. Other film deposition methods that may be used instead of magnetron sputtering are, for example, vapor deposition and ion beam sputtering. The underlayer film 2 should be formed under the preferred conditions including: a substrate temperature around 200° C., an Ar gas pressure from 1 to 10 mTorr, and a DC bias voltage of 100 to 500 V. The thickness of the underlayer film 2 is determined from a wide range corresponding to various factors, but the preferred thickness range is 10 to 100 nm.

This structure does not necessarily have to posses the underlayer 2, and one can deposit a magnetic layer 3 without an intervening underlayer on the substrate 1. Furthermore, a single layer or a multilayered structure is possible.

The recording layer 3 is composed of a multilayered ferromagnetic film formed by successively depositing a lower ferromagnetic layer 31, a non-magnetic layer 32, and an upper ferromagnetic layer 33. Co alloys form the lower and upper ferromagnetic layers 31 and 33 in the recording layer 3, which are the same as the magnetic recording layer in a conventional magnetic recording medium. For example, Co binary alloys such as CoPt, CoNi, CoCr, and CoFe; Co ternary alloys such as CoCrPt; and quaternary alloys or quinary alloys with Ta or Nb or B added to CoCrPt can be used. The ferromagnetic layers 31 and 33 are usually deposited by magnetron sputtering, or by one of the other aforementioned methods, and are preferably formed at a substrate temperature around 200° C. and under an Ar gas pressure of 1 to 10 mTorr.

Figure 1A:
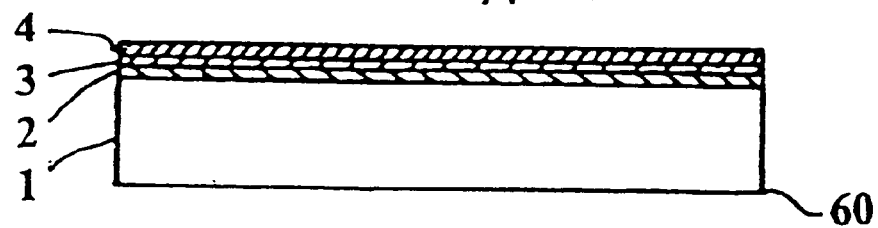
FIGS. 1A and 1B are cross-sectional views of a conventional magnetic recording medium.
Figure 1B:
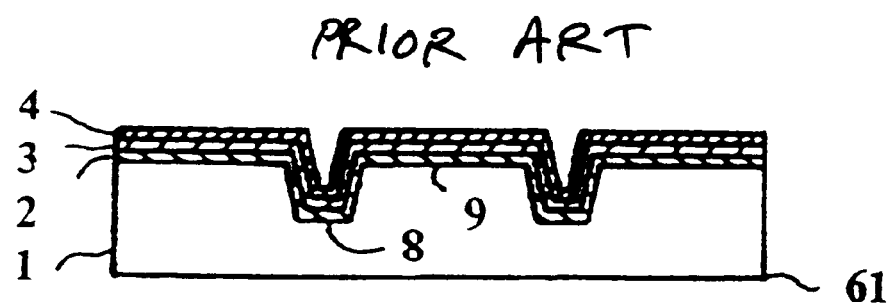

The lower ferromagnetic layer 31 and the upper ferromagnetic layer 33 may be formed from different materials or have different composition ratios. However, to obtain an adequate signal, the sum of the film thicknesses of the lower 31 and upper 33 ferromagnetic layers is nearly equal to that of a conventional magnetic layer as shown in FIG. 1, and is preferably about 200 Angstroms.

Specific materials for forming the non-magnetic layer 32 in the recording layer 3 are selected from non-magnetic transition metals like Ru, Cu, or Cr, but Ru, which obtains an excellent thin film, is preferred. The non-magnetic layer 32 is usually formed by sputtering (e.g. magnetron sputtering). Other forming methods are vapor deposition and ion beam sputtering. The film is formed preferably at a substrate temperature around 200° C. and under a gas pressure of 1 to 10 mTorr. The film thickness of the non-magnetic layer 32 is set to a value at which the lower ferromagnetic layer 31 and the upper ferromagnetic layer 33 are anti-ferromagnetically coupled, and is preferably no more than 10 Angstroms, although this may present problems for the material of the non-magnetic layer 32.

Figure 5A:
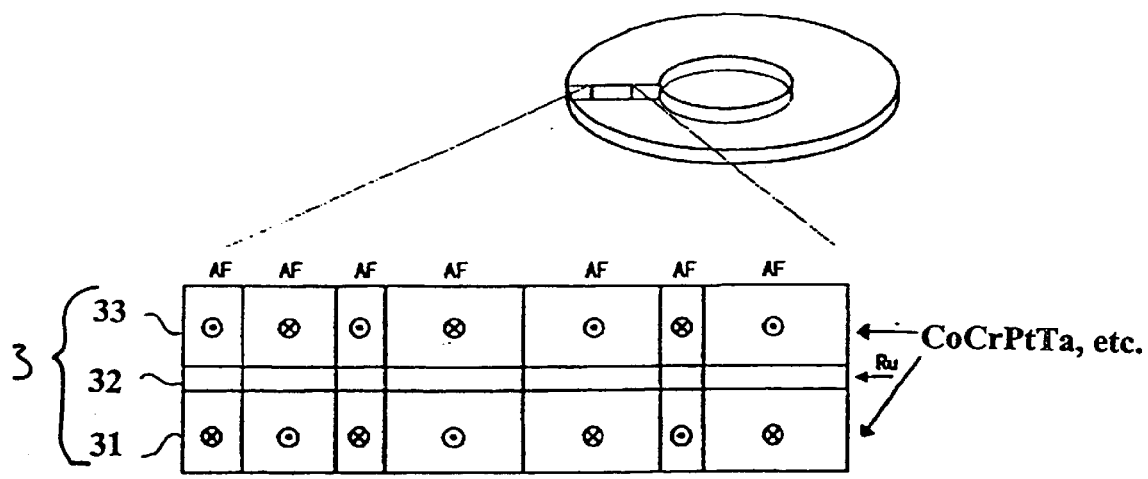
FIGS. 5A, 5B and 5C are diagrams that show changes in the magnetization state of the recording layer caused by heating.
Figure 5B:
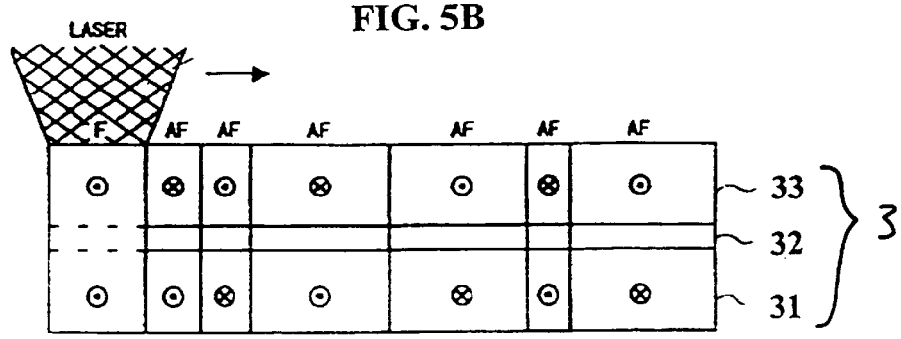
Figure 5C:
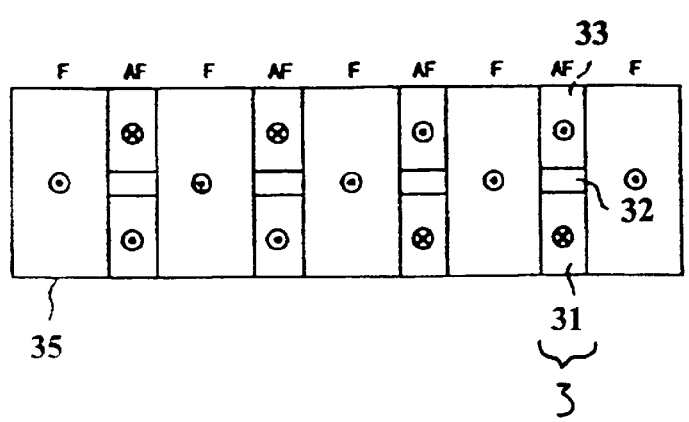

FIGS. 5A through 5C are cross-sectional views in the radial direction of the recording layer 3 in the magnetic recording medium 10 of the present invention, and show the magnetization state in the circumferential direction. As shown in these figures, the recording layer is divided into appropriately sized domains and magnetized. "F" in the figure indicates a ferromagnetic region. "AF" indicates a region in which the ferromagnetic layers 31 and 33 are anti-ferromagnetically coupled.

In the recording layer 3 of the magnetic recording medium 10, the ferromagnetic layers 31 and 33 are anti-ferromagnetically coupled across the entire area of the medium, as shown in FIG. 5A, when the film is formed. In this state, magnetic recording is not possible. Therefore, in the present invention, locally heating the recording layer 3 induces the non-magnetic layer 32 to spread, develops ferromagnetism in some regions, and creates a state where magnetic recording is possible.

Figure 7:
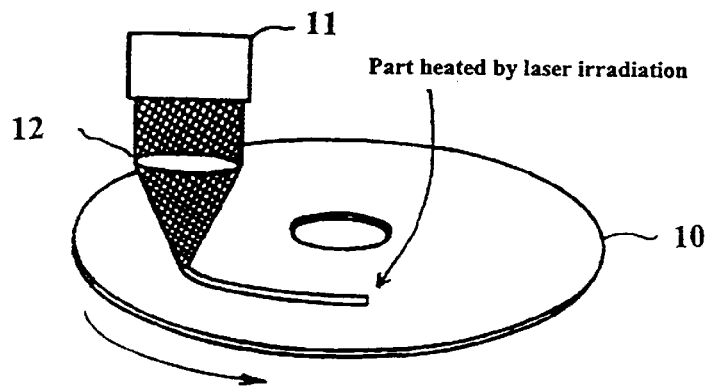
FIG. 7 shows the process for making the recording layer ferromagnetic.

As illustrated in FIG. 7, after the recording layer 3 is formed, the laser light emitted by the laser light source 11 is focused by the focusing lens 12 and falls incident on the surface of the medium 10 while the medium 10 is rotating. The recording layer 3 (FIG. 5A) is heated to at least 250° C. along the circumferential direction accompanying the rotation. The spot diameter of the laser light, with a wavelength of no more than 100 nm, is adjusted to be identical to the width of a recording track. The laser power preferably ranges from several dozen milliwatts (mW) to several watts (W). As shown in FIG. 5B, the regions heated in the recording layer 3 disappear because the non-magnetic layer spreads to the ferromagnetic layers 31 and 33. The ferromagnetic layers 31 and 33 are ferromagnetically coupled and are magnetized in the same direction. The laser spot is then set at prescribed intervals in the radial direction of the medium 1 (FIG. 4) and is moved to heat the recording layer 3 in concentric circular shapes. The sections not irradiated by the laser maintain anti-ferromagnetism.

Figure 6:
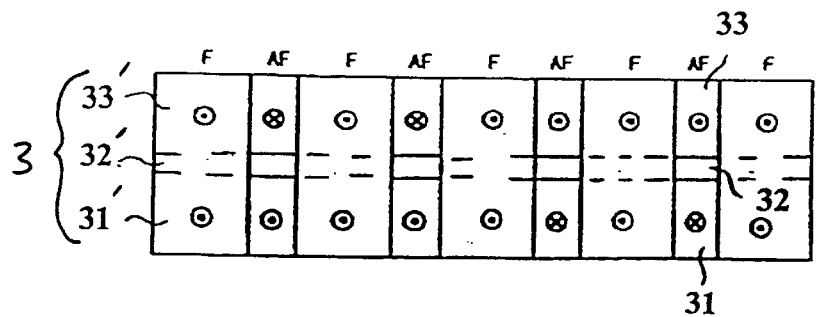
FIG. 6 is a diagram of another example of the magnetization state of the recording layer after heating.

The regions which are ferromagnetically coupled and the regions which are anti-ferromagnetically coupled alternately appear along the radial direction of the medium, as shown in FIG. 5C. Also shown in FIG. 5C, the non-magnetic layer 32 disappears over the entire object in the heated regions, and a ferromagnetic object 35 is formed. As shown in FIG. 6, the heated regions magnetize the ferromagnetic layers 31', 33' in the same direction even if a non-magnetic layer 32' remained without spreading, and the entire object can exhibit ferromagnetism. The extent of the spread of the non-magnetic layer depends on the recording layer heating time and the film thickness of the non-magnetic layer 32. As the heating time increases or the film thickness of the non-magnetic layer thins, the degree of spreading increases and easily produces the structure shown in FIG. 5C.

The sections which are anti-ferromagnetically coupled have a state in which the lower ferromagnetic layer 31 and the upper ferromagnetic layer 33 are magnetized in mutually opposite directions. The magnetization of the upper ferromagnetic layer 33 recorded by the leak magnetic field of the write head is negated by the magnetization of the lower ferromagnetic layer 31. Therefore, magnetic recording is not possible in the sections which are anti-ferromagnetically coupled. By allocating the sections which are ferromagnetically coupled as the recording tracks and allocating the sections which are anti-ferromagnetically coupled as the guard bands, the recording tracks are magnetically isolated and a high S/N is obtained. However, noise will result if the magnetization is not completely negated. This problem is solved by making the film thickness of the lower ferromagnetic layer 31 thicker than the film thickness of the upper ferromagnetic layer near the head, or by using a material that has a stronger magnetization than the upper ferromagnetic layer 33 in the lower ferromagnetic layer 31.

As described above, the present invention forms the guard bands by heating. In the method that forms the guard bands from grooves by making the width of a guard band ⅕ to ⅒ the width of a track, the precision of the process is moving closer to the limits of present technology. In the present invention, the forming process is not needed to form the guard bands, and the track width and the track pitch can be narrower.

The present invention features heating the regions that become the recording tracks. In contrast to the technique that heats the guard bands to produce guard bands having a higher coercive force or anti-ferromagnetism to prevent writing to the guard bands, the present invention has higher manufacturing tolerances to allow further increases in the track densities because the recording tracks, which are wider than the guard bands, are heated.

The protective film 4 (FIG. 4) becomes a carbon substance, a compound including carbon, for example, WC, SiC, B4C, hydrogen containing carbon, or diamond-like carbon (DLC) when attention is paid to having a high hardness. The protective film 4 is preferably formed by sputtering (e.g. magnetron sputtering). Other film forming methods, such as vapor deposition and ion beam sputtering, can be used instead of sputtering. The suitable conditions for forming the film are a film forming temperature from 20° C. to 100° C. and an Ar gas pressure from 1 to 10 mTorr. The film thickness of the protective film 4 depends on various factors and is set within a broad range, but is preferably from 5 nm to 20 nm.

A lubricant film 5 (FIG. 4) is composed of a fluorocarbon resin material and has a film thickness from 0.5 nm to 2 nm. The lubricant film 5 forms a film of the lubricant on the medium by submerging the medium 1 in a solution containing the lubricant material. The film thickness depends on the concentration of the material in the solution or speed at which the medium is drawn out of the solution.

Figure 8:
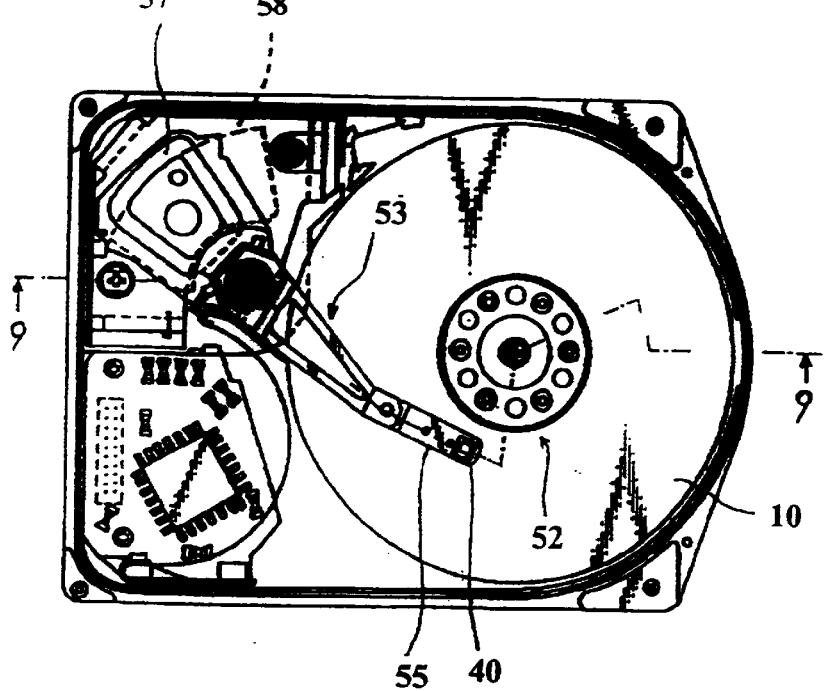
FIG. 8 is a top view of a magnetic disk apparatus equipped with the magnetic recording medium of the present invention.
Figure 9:
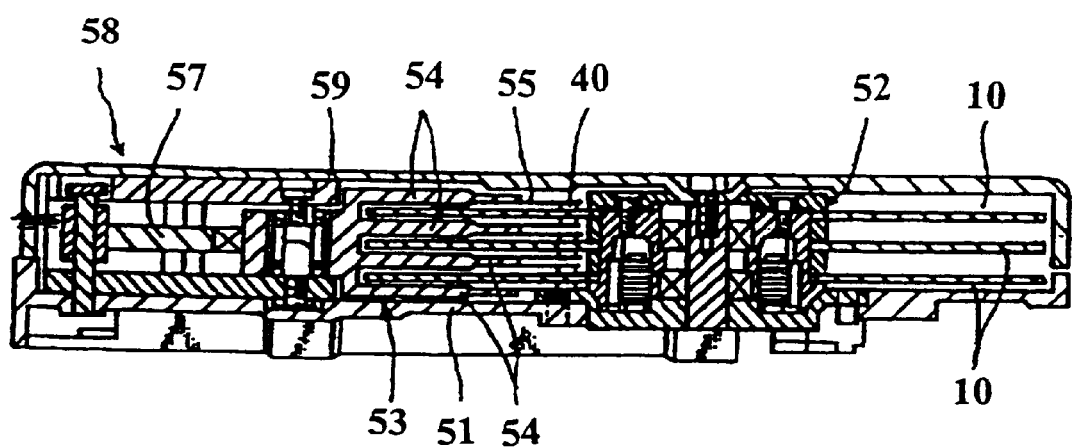
FIG. 9 is a cross-sectional view of the magnetic disk apparatus shown in FIG. 8.

The magnetic recording medium of the present invention is used as the recording medium of a magnetic disk apparatus. FIG. 8 and FIG. 9 show an example. FIG. 8 is a top view of the magnetic disk apparatus of the present invention in the state with the cover removed. FIG. 9 is a cross-sectional view along line 9—9 in FIG. 8.

In these figures, the magnetic disk 10 is driven by the spindle motor 52 installed on the base plate 51. In this embodiment, three magnetic disks are provided.

The actuator 53 is rotatably supported on the base plate 51. A plurality of head arms 54 are formed to extend in the direction parallel to the recording surface of the magnetic disk 10 at one end of the actuator 53. A spring arm is installed on one end of a head arm. The slider 40 is installed with an intervening insulation film, which is not shown, to the flexure part of the spring arm 55. A coil 57 is installed on the other end of the actuator 53.

The magnetic circuit 58 formed by a permanent magnet and a yoke is provided on the base plate 51; the top of the base plate 51 is covered by a cover 59. A voice coil motor (VCM) is constructed by a magnetic circuit 58 and a coil 57; the coil 57 is disposed in the magnetic gap of the magnetic circuit 58.

The operation of the magnetic disk apparatus described above is explained next. When the magnetic disk 10 stops, the slider 40 comes into contact with a parking zone of the magnetic disk 10 and stops. Next, when the magnetic disk 10 is rotated by the spindle motor 52, the slider 40 is floated at a small gap from the disk surface by the air flow produced by the rotation of the magnetic disk 10. If current flows in the coil 57 in the state with the slider floating, a propulsive force towards the coil 57 is generated, and the actuator 53 rotates. Then the slider 40 moves above the specified track of the magnetic disk 10 and reads or writes data.

Track edge noise is effectively suppressed because the guard bands of the magnetic disk 10 cannot be written in this magnetic disk apparatus. Furthermore, preventing writing to the guard bands is realized without using grooves, and the surface of the magnetic disk 10 is nearly flat. Therefore, the air flow on the magnetic disk surface produced by the rotation of the magnetic disk 10 is well regulated and can maintain stable floating of the slider 40.

The magnetic recording medium of the present invention has a recording layer with a multilayered ferromagnetic structure, and has regions in which the ferromagnetic layers are ferromagnetically coupled to each other and regions in which they are anti-ferromagnetically coupled. By allocating the regions of ferromagnetic coupling as the recording tracks, the recording tracks are magnetically separated and track edge noise is decreased. Thus, the intervals between the tracks can be narrowed and the track density can be increased. In addition, the magnetic recording medium of the present invention has a high degree of surface smoothness and stable floating of the head because grooves are not formed in the substrate. As a result, the amount of flotation of the head can be reduced, and the line density can be increased.

Consequently, noise reduction and higher densities for both the track density and the line density become possible according to the present invention. Thus, a more compact and higher capacity magnetic recording medium can be designed.

Various features of the invention are set forth in the appended claims.

What is claimed is:

1. A magnetic recording medium comprising:
    a first ferromagnetic layer;
    a non-magnetic layer; and
    a second ferromagnetic layer successively deposited as a recording layer on a non-magnetic substrate; wherein the recording layer includes:
        recording areas in which said first and second ferromagnetic layers are ferromagnetically coupled, and
        non-recording areas in which said first and second ferromagnetic layers are anti-ferromagnetically coupled,
        said non-recording areas being located between said recording areas;
        wherein said medium is a disk, and said recording areas and said non-recording areas are provided alternately in the radial direction in concentric circles.

2. A magnetic recording medium according to claim 1, wherein said first ferromagnetic layer has thicker film thickness than said second ferromagnetic layer.

3. A magnetic recording disk in which a recording layer is deposited on a non-magnetic substrate, the recording layer comprising:
    at least one recording area composed of a ferromagnetic material; and
    at least one non-recording area composed of:
        deposited layers of a first ferromagnetic layer;
        a non-magnetic layer; and
        a second ferromagnetic layer;
    wherein said recording areas and said non-recording areas are provided alternately in the radial direction in concentric circles.

4. A magnetic recording medium according to claim 3, wherein said first ferromagnetic layer has thicker film thickness than said second ferromagnetic layer.

5. A method for manufacturing a magnetic recording medium comprising:

successively depositing a first ferromagnetic layer, a non-magnetic layer, and a second ferromagnetic layer as a recording layer on a non-magnetic substrate; and locally heating portions of said recording layer to produce spaced ferromagnetic regions in the recording layer, wherein said locally heated portions create recording areas where said first and second ferromagnetic layers are ferromagnetically coupled, and portions of said recording layer that are not heated create non-recording areas where said first and second ferromagnetic layers are anti-ferromagnetically coupled.

* * * * *